US010994483B2

(12) United States Patent
Beets et al.

(10) Patent No.: US 10,994,483 B2
(45) Date of Patent: May 4, 2021

(54) DUAL ROLLER ASSEMBLY FOR SPREADING MATERIAL IN ADDITIVE MANUFACTURING APPARATUS

(71) Applicant: EOS of North America, Inc., Novi, MI (US)

(72) Inventors: Timothy A. Beets, Austin, TX (US); R. D. Jones, Round Rock, TX (US); Lance B. Shanklin, Georgetown, TX (US); Mike D. Conner, Pflugerville, TX (US)

(73) Assignee: EOS of North America, Inc., Novi, MI (US)

( * ) Notice: Subject to any disclaimer, the term of this patent is extended or adjusted under 35 U.S.C. 154(b) by 0 days.

(21) Appl. No.: 16/587,331

(22) Filed: Sep. 30, 2019

(65) Prior Publication Data

US 2020/0101665 A1  Apr. 2, 2020

Related U.S. Application Data

(60) Provisional application No. 62/739,651, filed on Oct. 1, 2018.

(51) Int. Cl.
*B29C 64/218*  (2017.01)
*B33Y 30/00*  (2015.01)
*B29C 64/153*  (2017.01)

(52) U.S. Cl.
CPC ............ *B29C 64/218* (2017.08); *B33Y 30/00* (2014.12); *B29C 64/153* (2017.08)

(58) Field of Classification Search
CPC ............................ B29C 64/218; B29C 64/205
See application file for complete search history.

(56) References Cited

U.S. PATENT DOCUMENTS

| 2001/0050448 | A1* | 12/2001 | Kubo | B29C 64/165 |
| | | | | 264/308 |
| 2011/0190446 | A1* | 8/2011 | Matsui | B29C 64/165 |
| | | | | 525/56 |
| 2011/0252618 | A1* | 10/2011 | Diekmann | B29C 64/25 |
| | | | | 29/401.1 |
| 2016/0221263 | A1* | 8/2016 | Din | B29C 64/236 |
| 2017/0341365 | A1* | 11/2017 | De Lajudie | B22F 3/1055 |
| 2018/0004192 | A1* | 1/2018 | Perret | B22F 3/1055 |
| 2018/0079033 | A1* | 3/2018 | Krueger | B29C 64/25 |
| 2018/0147781 | A1* | 5/2018 | Kobayashi | B33Y 30/00 |

FOREIGN PATENT DOCUMENTS

CN  108394094 A  *  8/2018

* cited by examiner

*Primary Examiner* — Joseph S Del Sole
*Assistant Examiner* — Jerzi H Moreno Hernandez
(74) *Attorney, Agent, or Firm* — Seyfarth Shaw LLP

(57) ABSTRACT

A dual roller powder spreader assembly for use in layerwise manufacture in a powder bed fusion additive manufacture process utilizes in an embodiment tilting of the dual roller assembly such that a lead roller is raised upwardly relative to the powder bed in a sweep. This is accomplished using a mechanical cam-like engagement initiated at each end of the assembly's travel, causing what will then be the lead roller to rise as a whole relative to the now following roller, the latter pushing the powder pile across the powder bed. The tilt process is reversed at each end of travel.

4 Claims, 5 Drawing Sheets

DUAL ROLLER ASSEMBLY FOR SPREADING MATERIAL IN ADDITIVE MANUFACTURING APPARATUS

FIELD OF THE INVENTION

The present invention relates to the field of additive manufacturing ("AM"), wherein successive layers of an object or workpiece are built up from a powder or other fluent medium according to previously determined successive so-called two-dimensional "slices" of the object or workpiece, and more particularly to an apparatus and method of operation using two rollers functioning in tandem for spreading of a powder layer being applied.

BACKGROUND OF THE INVENTION

Additive prototyping or additive manufacturing ("AM") techniques using a laser or other energy beam to melt, fuse, cure, sinter or otherwise solidify material to build an object or work piece (hereafter simply referred to as an object) in a layer-wise manner are well known. In one standard approach, an energy beam, such as a laser beam, is caused to scan over a build area in accordance with controlling apparatus that is driven by software that recreates a layer or slice of an object being built up. Layers are consecutively solidified and joined, as by fusing, melting, sintering or the like. In one type of AM, powder is provided in a build area or part bed of a build chamber. The powder is smoothed into a substantially planar surface at the top of the build area using a spreader device or apparatus. The laser is scanned over selected parts of that surface to form the desired "slice" of the object. Another layer of powder is then applied, typically being spread and smoothed by an applicator (sometimes referred to as a wiper, recoater, doctor blade, or also using a rotating roller) having a straightedge or the like, which pushes a deposited mound of powder across the build area and over the just-scanned slice. It is an intended result to yield a layer of powder that is of a consistent thickness across the build area one layer to the next.

Devices and methods of this kind are used for example for Rapid Prototyping, Rapid Tooling or Additive Manufacturing. An example of such a method is known by the name "selective laser sintering or laser melting". Therein, repeatedly a thin layer of pulverulent building material is applied, and the building material in each layer is selectively solidified by selectively irradiating positions with a laser beam corresponding to a cross-section of the object to be manufactured. Reference may be made to US Pat. Pub. 2018/0004192 for more particular detail of the general environment, operation and elements for the kind of dual-roller assembly described herein.

The term "build" is generally used to refer to the item or part that is constructed by controlling a laser or other heat source to melt powder particles in a layer-wise manner. The term "build procedure" is to be understood as the steps carried out to create a particular build using a particular type of material. A build procedure can involve essentially an entire sequence of control commands for a powder dispenser, a spreader assembly, a laser scanner assembly, and so forth for all levels of a build. Powder material as used herein can be a dry powder, or a material that is fluent and spreadable, as a slurry or the like. As used in the context of the invention, the terms "powder" and "powder material" are to be understood to mean a material comprising small particles that can flow freely when not contained. Polymer, metal and ceramic powder materials, among others, are well known.

The powder material is usually spread as an even layer over a surface of a build area or part bed, which is surrounded by a flat table or frame, of an additive manufacturing apparatus, using a spreader or recoater to move a deposited powder, i.e., a mound or deposit of powder or a "powder pile", from one end of the build area across the surface. A lower edge of the spreader maintains a slight clearance from the upper surface of the build area, so that a thin layer of powder is spread during each pass of the spreader. This step is carried out prior to each build layer being "scanned", through use of an energy source which solidifies the respective build layer according to the pre-determined horizontal cross-sectional "slice" of the object being built.

SUMMARY OF THE INVENTION

The present invention relates to a method and a device for additive manufacturing of a three-dimensional object by applying a building material, preferably a powder, layer by layer and selectively solidifying it, especially to a recoating unit contained in the device and used for the method or to a recoater provided therewith as well as to a recoating method.

The recoating method according to the invention is to be carried out in a device for additive manufacturing of a three-dimensional object by selectively solidifying a building material, preferably a powder, layer by layer, wherein the device comprises a recoater movable across a build area for applying a layer of the building material within the build area and a solidification device for selectively solidifying the applied layer at positions corresponding to a cross-section of the object to be manufactured and is formed and/or controlled to repeat the steps of applying and selectively solidifying until the object is completed. A recoating unit is used which comprises at least two recoating rollers spaced apart from each other in a first direction and extending into a second direction transversely, preferably perpendicularly, to the first direction, i.e., along the long axes of the rollers. The recoating rollers are adjusted in the recoating unit in a third direction perpendicular to the first direction and the second direction, i.e., up and down relative to the plane of the build area. As a general matter, the roller assembly of this invention in one aspect was designed to be a versital multi-functional system. Three functions, or embodiments/variants are provided in this aspect.

Function 1 (Roller Tilt)

1) Powder material for the build operation drops from a feed dispenser in between the two rollers of the dual roller assembly.
2) Orienting the reader so that you are viewing the AM powder bed fusion system from the front, the roller assembly moves left in one arrangement, and distributes powder under pre-heaters at the edge of the part bed, whereupon the leading roller tilts up, moves back to a home location on the left, leaving the power to preheat. The part bed is the surface of the build area where the layers of powder material are consecutively applied, to create pre-determined horizontal cross-sections of the object to be built. Preheat is to a temperature just below that of where the powder material would otherwise melt, fuse, or solidify. Pre-heat processes are well known and standard in the AM art.
3) When running 0.006 inch thick layers of material for the part bed for example, in this embodiment the elevator mechanism, upon which the object is to be built in layerwise fashion, will initially drop 0.003 inch down. The roller assembly will move left to right in this exemplary arrangement, distributing the powder over the part bed, with the leading roller having been tilted to ride above the part bed and the trailing roller distributing the powder by pushing it across the part bed, thereby filling the 0.003 gap created by the elevator moving downwardly. When the roller assembly reaches the right hand limit of its travel, the part bed will drop another 0.003 inch, and the roller assembly will now move right to left, distributing the material again across the part bed, with the leading roller (which was previously the trailing roller in the left to right movement) having been tilted to ride above the part bed and the trailing roller distributing the powder for the complete 0.006 thick layer desired.

4) This is repeated before every layer scan (application of a source of energy, as by a laser, to fuse/melt/solidify a layer according to the cross-section of the object applicable to that layer).

5) Tilting of the dual roller assembly is accomplished using a mechanical cam-like engagement initiated at each end of the assembly's travel, causing what will then be the lead roller to rise as a whole relative to the now following roller, the latter pushing the powder pile across the powder bed. The tilt process is reversed at each end of travel.

Function 2 (Fixed Roller)

1) In what will be referred to as "fixed" dual roller assembly, powder drops from the feed dispenser in between the two rollers, and is pre-heated as in the previous Function 1.

2) When running 0.006 layers as in the previous exemplary Function 1, the part bed will drop 0.003 down and the roller assembly will move left to right distributing the powder over the part bed, but with no tilting of the lead roller. When the roller assembly reaches the right limit the part bed will drop another 0.003 and the roller will move right to left distributing the material across the part bed for the complete 0.006 thick layer.

3) This is repeated for every layer scan.

Function 3 (Feed Complete Layer in One Pass)

1) As in the previous two Functions described above, powder drops from the feed dispenser in between the two rollers.

2) When running 0.006 layers, the part bed in this arrangement will drop 0.006 down and the roller assembly will move left to right distributing the power over the part bed, with or without roller tilt and powder preheat. When the roller assembly reaches the right hand limit of its travel across the part bed, the layer just deposited will be scanned, and then the roller assembly will move right to left distributing the material across the part bed to thereby complete two 0.006 layers with a roller assembly pass left to right and back right to left.

The present invention finds advantages and innovations in the powder spreading apparatus and its method of operation and use described hereafter.

DETAILED DESCRIPTION OF EMBODIMENTS

As noted, the present disclosure has found particular application in the production of objects, or workpieces, in an additive manufacture process which utilizes a radiant beam of energy, such as a laser, to solidify a fluent material, such as a powder, in a layer-wise build-up of the object. In a typical process of this type, a layer of powder is spread and smoothed over the top plane or surface of a build area in which the object is being generated. Each layer corresponds with a two-dimensional "slice" of the object, which is then solidified (e.g., fused, melted, sintered) from the powder. The object is built up by moving the solidified layer(s) incrementally downwardly in the build chamber, and a fresh layer of powder then being spread by a recoater (sometimes also referred to as a doctor blade, applicator, slide, refreshing device, roller and other names), which takes a charge or load of material deposited in front of the recoater and then moves that material across the build area to form the fresh or new layer. This procedure repeats until the object is completed.

Figure 1:
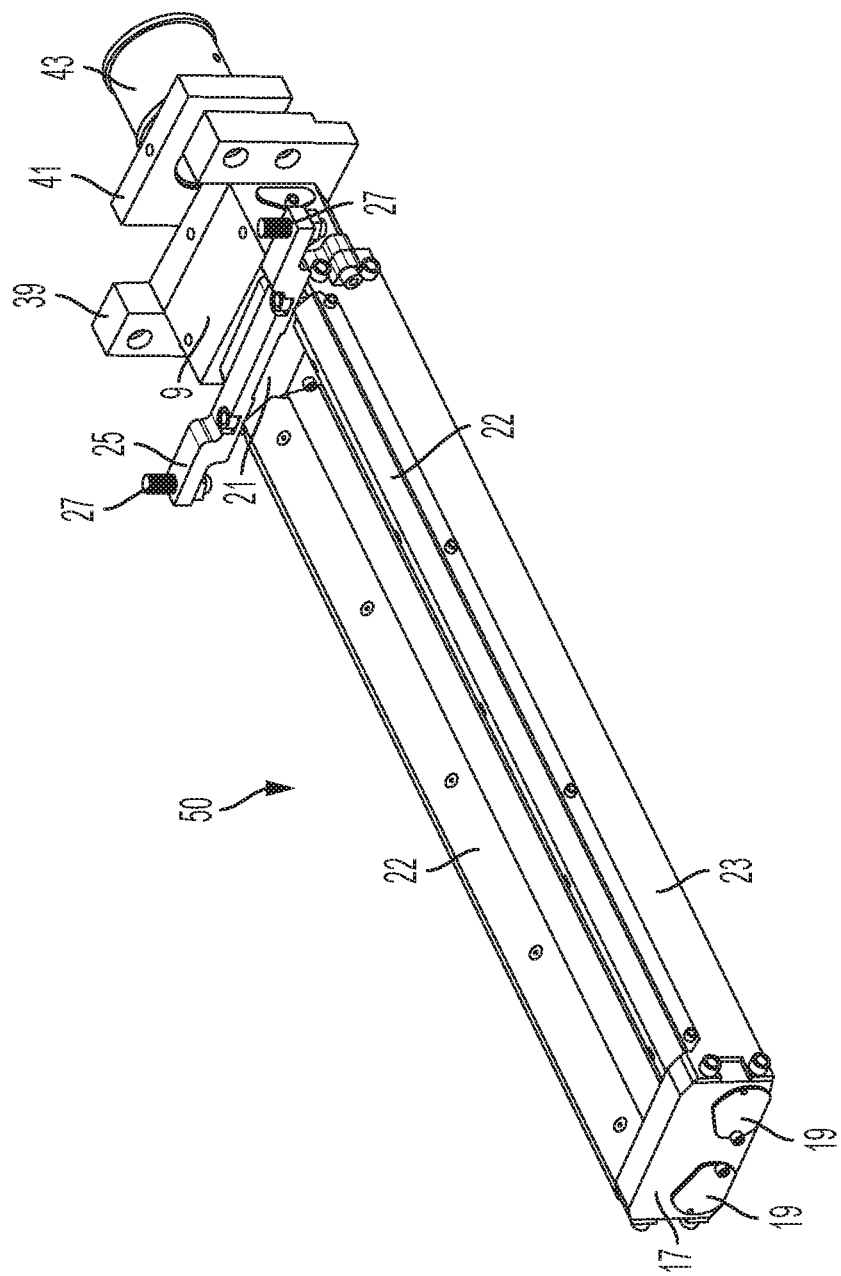
FIG. 1 is a perspective view of a dual roller assembly made in accordance to an embodiment of the invention.
Figure 2:
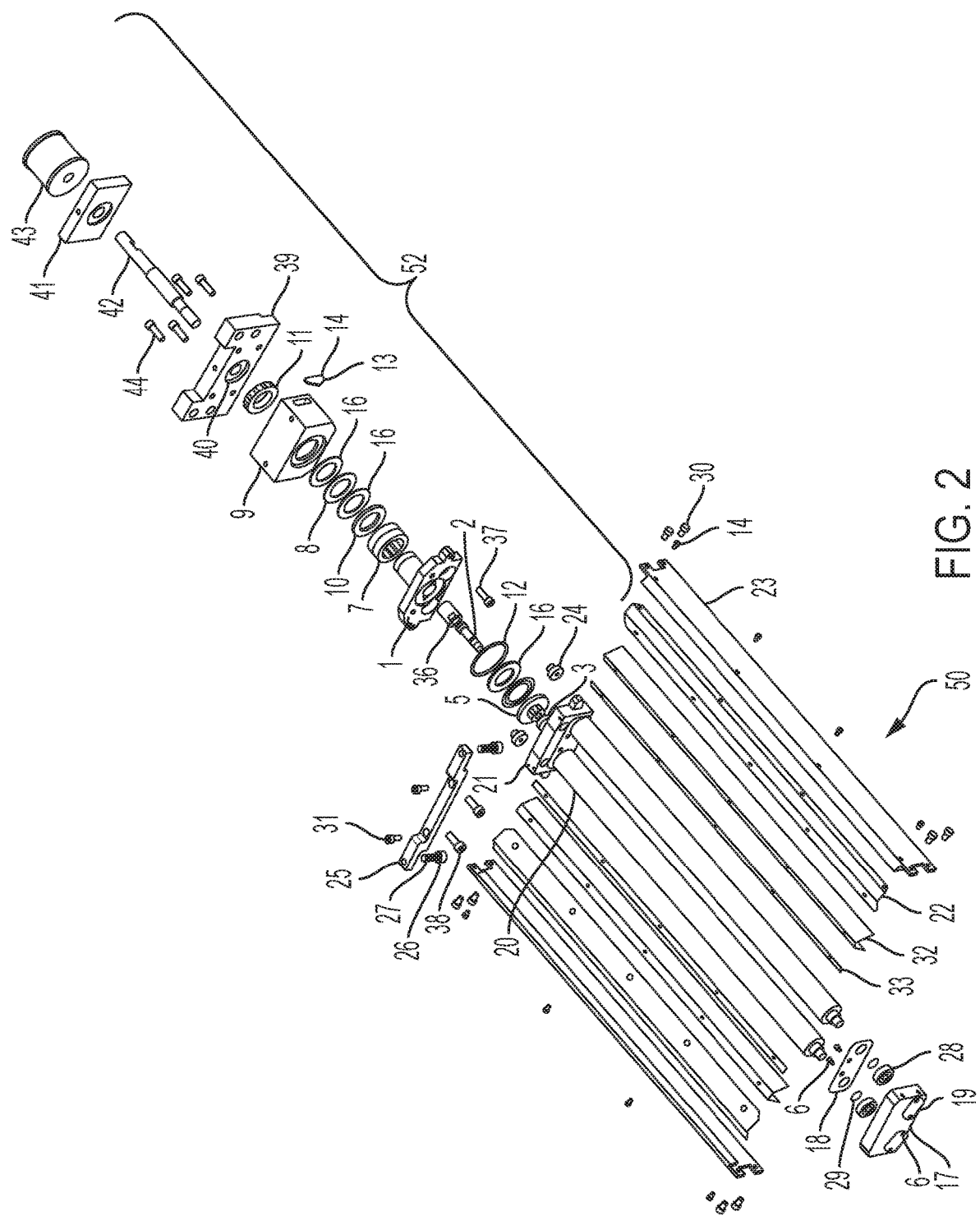
FIG. 2 is an exploded perspective view of the assembly of FIG. 1.

Turning now to FIGS. 1 and 2, and with various collateral reference to FIGS. 6 through 10, a first embodiment of the novel dual roller powder spreader assembly 50 is shown. The assembly 50 has two rollers 20 which operate in tandem. The rollers 20 are received at one end in a back plate 21 having roller bearings mounted therein. At the other end, the rollers are received in an end plate 17, also having roller bearings 28 with seals 29 held by skirt 18 within the end plate 17. Covers 19 close access to the bearings 28 in the end plate 17.

Side plates 23 and associated funnels 22 extend along the lateral sides of the assembly 50, along the long axis thereof. Scrapers 32 act as wipers for the rotating rollers 20.

The rollers 20 are driven by a roller drive mechanism general denominated at 52. That includes a bearing spindle 1, bearing 7, bearing block 9 for roller pivot, roller bearing 40 in a bearing block 39. Shaft 42 extends from capstan 43 through bearing block 41, and operates in a counter-rotating manner.

Coupling 39 for the roller drive extends within the bearing spindle 1, engaging with gear and spur 5, which engages respective roller gears 24.

As will be described in more detail hereafter, there is a tilt mechanism for this embodiment of the dual roller assembly 50. It has a pivot arm 25 mounted to the top of back plate 21, with set screws 27 depending from either end.

Figure 4:
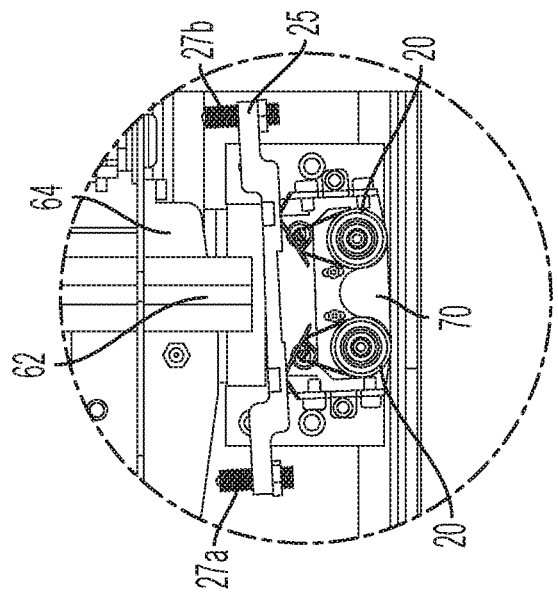
FIG. 4 is an enlarged view of area A of FIG. 3.
Figure 3:
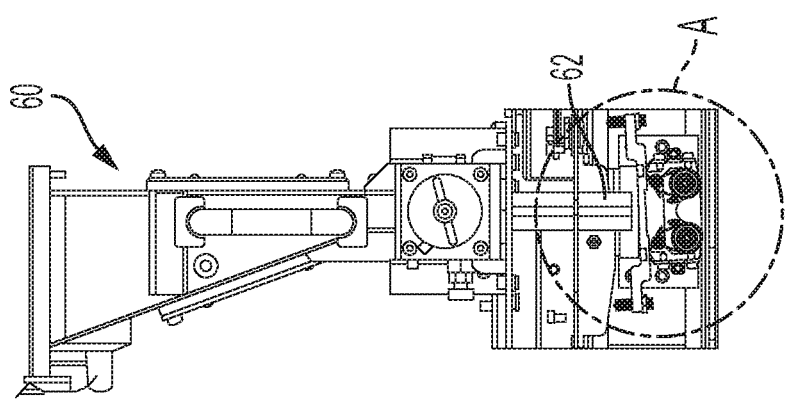
FIG. 3 is a partial vertical cross-section through the assembly of FIG. 1 showing powder loading into the assembly.
Figure 5:
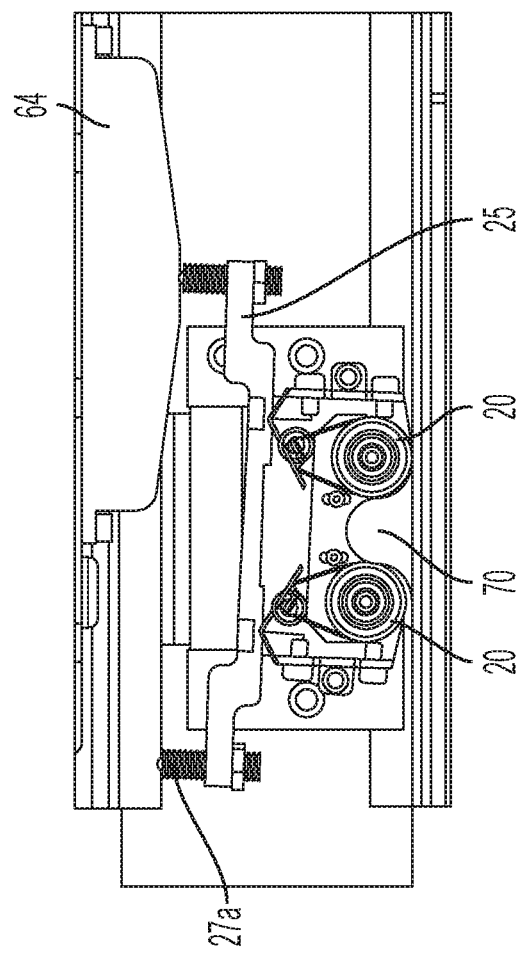
FIG. 5 is a view similar to that of FIG. 4, but showing the assembly in position opposite from that of FIG. 4.
Figure 6:
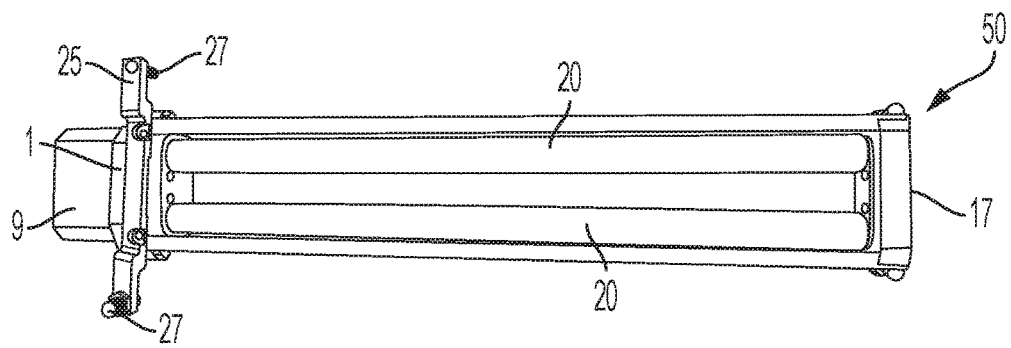
FIG. 6 is a top plan view of an assembly according to the embodiment of FIG. 1.
Figure 7:
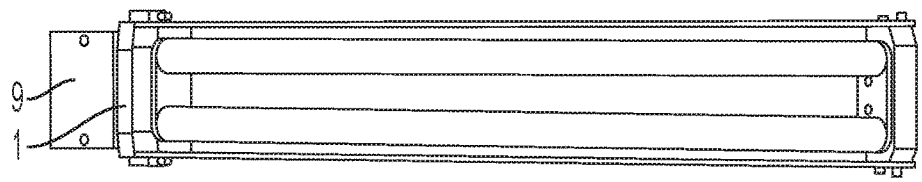
FIG. 7 is a top plan view of an assembly modified from that of FIG. 1.
Figure 8:
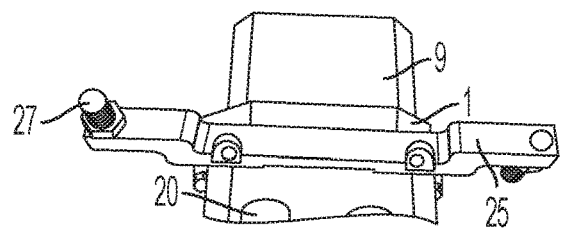
FIG. 8 is a top plan view of the tilt mechanism of the assembly of FIG. 6.
Figure 9:
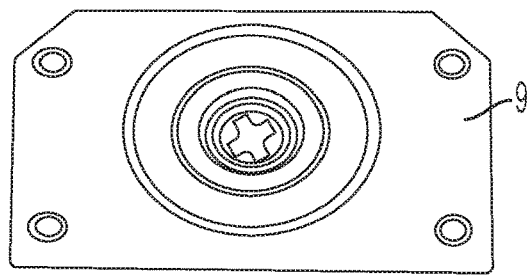
FIG. 9 is an end view of assembly shown in FIG. 7.
Figure 10:
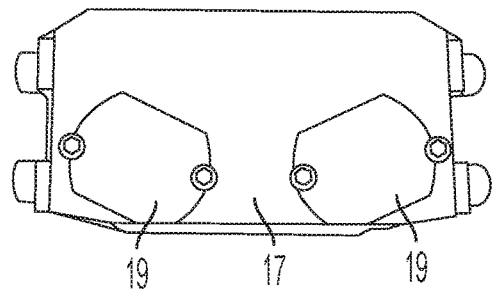
FIG. 10 is an end view of the other end of the assembly of FIG. 7.

Turning now to FIGS. 3 through 5, the tilt mechanism and operation of this embodiment will be understood. Powder material is fed from a material feed dispenser 60, being metered into the space between the rollers 20. The dispenser and its manner of metering are well known in the art. The dispenser 60 has a feed tube 62. As seen in FIGS. 3 and 4, in this exemplary arrangement there is a fixed rotation bracket 64 located at the end of travel of the roller assembly 50 at each side of the end of travel. For ease of understanding, FIGS. 3 and 4 depict an arrangement where the dual roller assembly 50 is at the end of travel to the reader's left hand side (facing the powder bed). As shown, the set screw 27 (shown here as element 27a) has engaged with the sloped inwardly facing bottom edge of the rotation bracket, in a kind of caming action. This then tilts the pivot arm 25 in a manner to rotate, or tilt, the roller which will now be in the forward position—for the powder sweep left to right—upwardly relative to the powder bed and the roller now in the rearward position. Note that powder 70 has been deposited between the rollers by the dispenser 60, forming an elongated pile therebetween. This powder pile is then traversed along and across the powder bed by the movement of the entire roller assembly 50.

The dual roller system is made up of two counter-rotating rollers. Continuing with the convention of left and right when viewing the Figures, the left-hand roller 20 turns counterclockwise on its long axis, and the right-hand roller 20 rotates clockwise. This serves to mound powder in between the two rollers 20. There is a gear in between the rollers 20 so they will move at the same speed. The counter rotation is maintained by using a cable system that turns a pulley thus causing the counter rotation.

The tilt function of the dual roller system has multiple functions.

Single side powder feed with powder preheat: When the roller assembly 50 moves all the way to the left side of the build area, it is located under the powder feed bin. The right-hand roller 20 is tilted up off of the powder bed at this point, and material drops in between the dual rollers. Note that in general, how the two rollers function, i.e., relatively tilted or both co-planer, depends on the material being used, and desired operation. Continuing now with this single side mode, the roller assembly with its load of material then moves to the right 6 inches, stops and returns to the leftmost position. This allows exposing the loose powder to preheat under the part heater. Pre-heating accomplished, the roller assembly 50 then moves across the build area (here left to right) to apply a fresh layer of material; the right-hand roller is raised or tilted upwardly. The part bed will have dropped 0.003 of an inch to accommodate the new layer.

Once the roller assembly reaches the right-hand limit of travel, the orientation of the rollers 20 is reversed. The formerly trailing roller (the left-hand roller) is caused to tilt up above the powder bed and the right-hand roller drops into position to push material back across the build area. Now turning to FIG. 5, what is shown is the arrangement now at the far right hand side of the sweep. Set screw 27b has now engaged the bracket 64 at this end of travel, camming the pivot arm 25 downwardly on the far right, thereby rotating or tilting what was previously the rearward roller 20 upwardly and the formerly forward roller 20 downwardly. The roles of the rollers are now reversed for the travel back across the powder bed (i.e., from right to left of the reader). The part bed will have dropped another 0.003 of an inch, and the roller assembly 50 distributes the remaining powder across the part bed finishing the layer.

Double side powder feed with powder preheat: In this mode of operation, it is basically the same as in the previously described single side operation, but with preheat on both ends of the path of travel. Here, enough powder material has been deposited between the two rollers 20 for about 2-4 layers to be built. Again, when the roller assembly moves all the way to the left side of the machine under the powder feed bin the trailing roller (right-hand) is tilted up off of the powder bed and material drops in between the dual rollers. The roller assembly then moves to the right 6 inches, stops and returns to the left side exposing the loose powder to preheat under the part heater. The part bed will drop 0.006 of an inch (rather than 0.003) and the roller assembly will move left to right distributing the material across the part bed. Once the roller hits the right limit, that causes the trailing roller (left-hand) to tilt up above the powder bed. In this mode, however, the pre-heat process is repeated, but now on the right-hand side of the build area. The part bed will drop another 0.006 of an inch, and the roller assembly 50 distributes the powder across the part bed now moving right to left according to the descriptive convention being used herein.

Duel roller configuration with no tilt or preheat: In order to decrease the time it takes to add a layer of powder, it may be desirable to use a roller configuration that places both rollers on the part bed simultaneously, i.e., coplanar. This allow the roller assembly to stop as soon as it crosses the part bed, wait for scanning to complete and return to the left adding another layer of powder before returning home, therefore speeding up the entire process; home is with the roller assembly located under the feed container on the left side of the machine. This is good for lower temperature materials that do not require additional preheating.

Duel roller configuration with different texture to the rollers: In certain cases in order to get a good flow of powder distributed across the part bed, rollers that are textured may be used. Textured rollers help create a wave effect, thus not "bulldozing" across the part bed. This leaves a nice even powder bed for the next scan.

Drive and control of the roller assembly 50 across the powder bed to create one layer of material to be solidified after another is carried out in a manner well known in the art.

The dual roller assembly 50 can also be operated in a manner where a single layer to be solidified can be accomplished in a method where one half of the layer is deposited in a first pass and then completed in a pass back depositing the other half thickness of the layer. The single layer could also be deposited in one pass (e.g., left to right) of the desired layer thickness, and the next layer deposited in one pass back (e.g., right to left).

Having set forth an embodiment of the invention herein, those of skill in the art will recognize variations, modifications, substitutions, and the like which will fall within the spirit of the invention, and are intended to be covered by the claims which follow.

What is claimed is:

1. A spreader assembly for equipping or retrofitting a system for additive manufacturing of a three-dimensional object by selectively solidifying a building material, layer by layer, wherein the spreader assembly is movable across a build area for applying a layer of the building material within the build area and a solidification device of the system selectively solidifying the applied layer at positions corresponding to a cross-section of the object to be manufactured, the system repeating the steps of applying and selectively solidifying until the object is completed, the spreader assembly comprising:

a plurality of rollers spaced apart from each other and forming a gap therebetween, coupled together to operate as an assembly in a counter-rotating manner relative to each other, arranged to receive the building material between the rollers in a pile in the gap to be spread across the build area in a layer over a build area plane, and mounted to a pair of plates, with a plate located at opposite ends of the rollers;

a drive train associated with the rollers, configured to move the assembly back and forth over the build area plane, and configured to operate the rollers in the counter-rotating manner; and a mechanism configured to selectively tilt and elevate each of the rollers above and out of the build area plane such that during transverse movement of the assembly one of the rollers is a lead roller and is tilted out of the build area plane and another of the rollers is a trailing roller and is engaged to spread the building material, the mechanism including a mechanical switching device that is actuated at each end of travel of the assembly to reverse the orientation of the rollers relative to the build area plane, the mechanical switching device including a pivot arm mounted to a plate, with set screws depending from either end of the pivot arm, a set screw engaging with a sloped inwardly facing bottom edge of a rotation bracket which is mounted at either end of travel of the assembly across the build area, in a camming action, to thereby tilt the rollers, and wherein the mechanical switching device is configured to selectively tilt each of the rollers in the assembly via a mechanical cam-like engagement initiated at each end of the assembly's travel, causing what will then be the lead roller to rise as a whole relative to the now trailing roller, the trailing roller pushing the pile of building material across the build area.

2. A spreader assembly for equipping or retrofitting a system for additive manufacturing of a three-dimensional object by selectively solidifying a building material, layer by layer, wherein the spreader assembly is movable across a build area for applying a layer of the building material within the build area and a solidification device of the system selectively solidifying the applied layer at positions corresponding to a cross-section of the object to be manufactured, the system repeating the steps of applying and selectively solidifying until the object is completed, the spreader assembly comprising:

a pair of opposed tandem rollers each having a longitudinal axis, the tandem rollers spaced apart to create a gap configured for receiving building material for from a feed dispenser in between the tandem rollers, coupled together to operate as a roller assembly, and mounted to a pair of plates, with a plate located at opposite ends of the tandem rollers;

a drive mechanism arrangement moving the roller assembly across a horizontally arranged part bed surface defining a part bed build area, the part bed surface being the surface of the build area where the layers of the building material are consecutively applied, to create pre-determined horizontal cross-sections of the object to be built; and a tilt mechanism for the tandem rollers, the tilt mechanism configured for lifting a leading roller to tilt up and off the part bed surface, the leading roller being that roller which is foremost when the drive mechanism moves the tandem rollers across the build area from a start position, and a trailing roller distributing the building material by pushing the building material across the part bed surface, the trailing roller being that roller which is not the leading roller, the tilting mechanism including a pivot arm mounted to a plate, with set screws depending from either end of the pivot arm, a set screw engaging with a sloped inwardly facing bottom edge of a rotation bracket which is mounted at either end of travel of the tandem rollers across the part bed surface, in a camming action, to thereby tilt the tandem rollers, and wherein the tilt mechanism is further configured for switching the function of the leading and trailing rollers upon reaching an end of travel point for the tandem rollers, such that the formerly trailing roller becomes the leading roller when the tandem rollers are moved by the drive mechanism back across the build area to the start position, with the leading roller having been tilted to ride above the part bed surface and the now trailing roller distributing the building material for a layer desired.

3. A spreader assembly for equipping or retrofitting a system for additive manufacturing of a three-dimensional object by selectively solidifying a building material, layer by layer, wherein the spreader assembly is movable across a build area for applying a layer of the building material within the build area and a solidification device of the system selectively solidifying the applied layer at positions corresponding to a cross-section of the object to be manufactured, the system repeating the steps of applying and selectively solidifying until the object is completed, the spreader assembly comprising:

a pair of opposed tandem rollers each having a longitudinal axis, the tandem rollers spaced apart to create a gap configured for receiving building material from a feed dispenser in between the tandem rollers, coupled to ether to operate as a roller assembly, and mounted to a pair of plates, with a plate located at opposite ends of the tandem rollers;

a drive mechanism arrangement moving the roller assembly across a horizontally arranged part bed surface defining a part bed build area, the part bed surface being the surface of the build area where the layers of the building material are consecutively applied, to create pre-determined horizontal cross-sections of the object to be built, wherein the building material is powder; and a tilt mechanism for the tandem rollers, the tilt mechanism configured for lifting a leading roller to tilt up and off the part bed surface, the leading roller being that roller which is foremost when the drive mechanism moves the tandem rollers across the build area from a start position, and a trailing roller distributing the powder by pushing it across the part bed surface, the trailing roller being that roller which is not the leading roller, the tilting mechanism including a pivot arm mounted to one of the plates, with an element extending from either end of the pivot arm, each element respectively engaging with a sloped inwardly facing bottom edge of a rotation bracket which is mounted at either end of travel of the tandem rollers across the part bed surface, in a camming action, to thereby move the pivot arm about a pivot point and thereby tilt the tandem rollers relative to one another, and wherein the tilt mechanism is further configured for switching the function of the leading and trailing rollers upon reaching an end of travel point for the tandem rollers, such that the formerly trailing roller becomes the leading roller when the tandem rollers are moved by the drive mechanism back across the build area to the start position, with the leading roller having been tilted to ride above the part bed surface and the now trailing roller distributing the building material for a layer desired.

4. The spreader assembly of claim 3, wherein the element extending from the pivot arm is a set screw.

\* \* \* \* \*